United States Patent [19]

Stansak

[11] 4,028,782

[45] June 14, 1977

[54] CUTTING INSERT AND TOOL HOLDER ASSEMBLY THEREFOR

[75] Inventor: Donald Edward Stansak, Wyano, Pa.

[73] Assignee: Teledyne Mid-America Corporation, Los Angeles, Calif.

[22] Filed: Feb. 13, 1976

[21] Appl. No.: 658,002

Related U.S. Application Data

[63] Continuation-in-part of Ser. No. 494,379, Aug. 5, 1974, abandoned.

[52] U.S. Cl. .................................. 29/95 R; 29/96
[51] Int. Cl.² ......................................... B26D 1/00
[58] Field of Search .............................. 29/95 R, 96

[56] References Cited

UNITED STATES PATENTS

| | | | |
|---|---|---|---|
| 2,537,837 | 1/1951 | LaBrozzi et al. | 29/96 |
| 3,557,416 | 1/1971 | Jones | 29/95 R |
| 3,754,309 | 8/1973 | Jones et al. | 29/96 |
| 3,821,837 | 7/1974 | Faber | 29/96 |

*Primary Examiner*—Leonidas Vlachos

[57] ABSTRACT

A cutting insert comprised of a body of hard wear resistant material is precision indexed and held in a cut-out of a tool holder by a bridge clamp. The body has first and second opposed major surfaces, and at least one and preferably two substantially parallel precision indexing surfaces capable of precision indexing of the body in the cut-out of the tool holder. At least one and preferably two cutting edges are preferably provided at opposite end portions of the body for cutting metal. At least one and preferably two notches complementary to each other are provided in at least first major surface and adapted to rigidly hold the body in the cut-out of the tool holder with an indexing surface and the bridge clamp. Each notch has an engaging surface forming a compound angle with a major surface defined by an angle greater than about 10° and less than about 30°, preferably less than about 20°, to the indexing surface, and an angle of greater than about 3° and preferably less than about 30° to a plane defined by the first major surface.

16 Claims, 8 Drawing Figures

CUTTING INSERT AND TOOL HOLDER ASSEMBLY THEREFOR

RELATED APPLICATION

This application is a continuation-in-part of Ser. No. 494,379, filed Aug. 5, 1974, now abandoned.

FIELD OF THE INVENTION

The present invention relates to machine tools and particularly throw-away cutting inserts adapted for mounting in tool holder assemblies utilized in machine tools.

BACKGROUND OF THE INVENTION

Threading, grooving and profiling of metals by turning on a lathe are well known. The cutting tool is a throw-away insert detachably mounted in a tool holder. The tool holder is, in turn, mounted on a tool slide and carriage for precision movement radially and parallel to the axis of rotation of the metal. Exemplary of the art found is U.S. Pat. Nos. 2,598,581, 2,641,049, 2,737,705, 2,787,823, 2,846,756, 2,961,743, 2,964,833, 2,967,345, 2,976,028, 3,090,104, 3,324,529, 3,354,527, 3,377,685, 3,383,748, 3,488,822 and 3,557,416.

A primary problem is that such cutting inserts must be rigidly indexed with precision in the tool holder for precision working of the metal. The problem is particularly acute in profiling operations where complex workpiece configurations are formed. The forces exerted on the cutting insert by the machine tool are changing and varying. Moreover, the depth of the cut taken, thickness of the chips taken, the actual cutting edge of the insert used, and the direction of the chip flow across the cutting edge of the insert are changing and varying.

Particularly for profiling, the standard means utilized for indexing cutting inserts in the tool holder has been a V-shaped bottom which runs the length of the insert. The V-shaped bottom mates with an opposite V-shaped groove in the tool holder. The difficulty is that these V-shaped bottoms are expensive to make because they must be formed by precision machining and grinding. Cutting inserts are typically made from tungsten carbide by pressing and sintering a fine powder according to well-established procedures. This technique involves substantial shrinkage so that dimensions cannot be held in close tolerances; and machining and grinding of tungsten carbide requires diamond-cutting and abrading means.

It has been proposed to eliminate the V-shaped bottom by indexing the insert with a top notch, called a "whistle notch." That is, a groove extending obliquely across the top of the insert at an angle of about 45° to 50° to the indexing surface. The notch is engaged and the cutting insert indexed by a bridge clamp extending from the tool holder. The prime problem with these top-notch inserts is that the tool cannot be fed to the workpiece in both the forward and reverse directions. Furthermore, such top-notch inserts are of limited life because they cannot be reindexed to a new cutting edge by rotation. The insert may be given additional life by providing cutting edges at opposite ends and flipping the insert to the new cutting edge. In addition, such inserts are asymmetric in configuration which makes them complicated and expensive to form.

The present invention overcomes these difficulties and disadvantages. All portions of the cutting edges can be utilized on each insert. The inserts also provide for a universal tool holder assembly which can be used for threading and grooving as well and profiling.

SUMMARY OF THE INVENTION

A cutting insert is provided that can be made by pressing and sintering by established techniques without machining and grinding. The cutting insert also has prolonged life by permitting utilization of portions of cutting edges adjacent both major surfaces of the insert at both ends of the cutting insert.

A cutting insert is comprised of a body of hard wear resistant material typically tungsten carbide. The body has first and second opposed major surfaces preferably of planar configuration and at least one indexing surface preferably substantially perpendicular to the major surfaces capable of precision indexing of the body in a cut-out of a tool holder. The body has at least one and preferably two cutting edges at opposite end portions for cutting metal.

At least one notch is provided in first major surface adapted to rigidly hold the body in the cut-out of the tool holder with an indexing surface and a bridge clamp. The notch has an engaging surface forming a compound angle with said first major surface defined by an angle of greater than about 10° and less than about 30° to one said indexing surface and an angle of greater than about 3° and preferably less than about 30° to a plane defined by the first major surface. Preferably, the engaging surface forms a compound angle of less than about 20° and most desirable about 15° to said indexing surface.

Preferably two notches are provided in the first major surface that are complementary to each other. The body is thus adapted to be reversibly held in the cut-out of the tool holder with the two substantially parallel indexing surfaces and the bridge clamp. The life of the insert can thus be rotated to provide for cutting with cutting edges at opposite end portions of the body.

In addition, at least one and preferably two complementary notches are also preferably provided in the second major surface. The body is thus adapted to be reversibly held in the cut-out of the tool holder with the two substantially parallel indexing surfaces on flipping of the insert as well as rotation of the insert. Optimum useful life can thus be obtained with the cutting insert by utilizing portions of the cutting edges adjacent both major surfaces.

Preferably the cutting is incorporated into a tool holder assembly which can be universally utilized for threading and grooving operations as well as profiling operations. The assembly comprises a tool holder having a cut-out therein for precision indexing of a cutting insert for the cutting of metal. A bridge clamp is also provided for holding the cutting insert in the cut-out of the tool holder by clamping an engaging surface of the insert and removably fastening the bridge clamp to the tool holder.

Other details, objects and advantages of my invention will become apparent as the following description of the present preferred embodiments of the invention and present preferred ways of making and practicing the same proceeds.

BRIEF DESCRIPTION OF THE DRAWINGS

In the accompanying drawings, the presently preferred embodiments of the invention and the presently preferred ways of making and practicing the invention are illustrated, in which.

DESCRIPTION OF THE PREFERRED EMBODIMENTS

Figure 1:
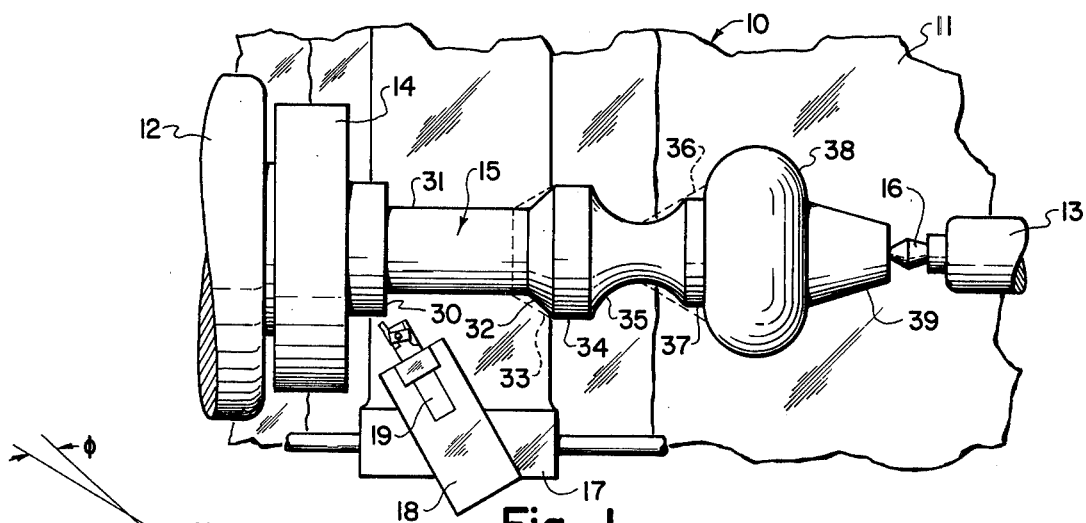
FIG. 1 is a partial top view of a lathe with a tool holder assembly and cutting insert assembled therein and with a workpiece which has been profiled with the present invention.

Referring to FIG. 1, the machine tool in which the present invention is utilized is generally shown. A lathe 10 is partially shown with bed 11, head stock 12 and tail stock 13. Head stock 12 comprises a chuck assembly 14 which supports for turning one end of metal workpiece 15, and tail stock 13 comprises a spindle assembly 16 which supports for turning the other end of workpiece 15. The shape of workpiece 15 is illustrative and shows various conditions encountered during turning operations.

Lathe 10 also comprises carriage 17 movably attached to bed 11 for precise movement parallel to the axis of workpiece 15. Tool slide 18 is mounted on carriage 17 for movement toward and away from the workpiece at a preselected angle as shown in FIG. 1. The movement of carriage 17 along the axis of the workpiece and tool slide transverse to the axis of the workpiece may be automatically controlled by any suitable means. For example, the movement may be controlled by a template-follower-servo-mechanism, or a punch or magnetic tape computer mechanism. These various mechanisms are well-known to those skilled in the art.

Figures 2, 3:
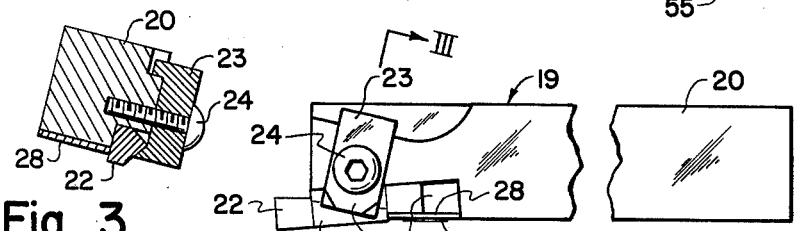
FIG. 2 is a partial top view of a tool holder assembly embodying the present invention as utilized in FIG. 1.
FIG. 3 is a cross-sectional view taken along line III—III of FIG. 2.

Tool holder assembly 19 is mounted on tool slide 18. Referring specifically to FIGS. 2 and 3, the tool holder assembly comprises tool holder 20 having cut-out 21 therein for precision indexing of cutting insert 22 for the cutting of metal workpiece 15. The cutting insert 22 is rigidly held and removably fastened in cut-out 21 of holder 20 by bridge clamp 23. Bridge clamp 23 is held to tool holder 20 by cap screw 24, and contacts insert 22 at engaging surface 25 of notch 26 with clamp head 27. Clamp head 27 has a compound angular surface to match the angle of surface 25. Preferably cutting insert 22 is also indexed and held in cut-out by side plate 28 fastened to tool holder 20 by cap screws 29.

In operation, metal workpiece 15 is transversed by cutting insert 22 from end to end. Assuming that the cutting operation is performed from left to right, cutting insert 22 would first radially face surface 30 and then turn cylindrical surface 31. At the end of cylindrical surface 31 is conical surface 32; however, conical surface 32 is at too great a pitch to be cut by the cutting insert with tool slide 18 set at the angle shown. Instead, cutting insert 22 contains the conical surface shown by dotted line 33, and conical surface 32 is later formed by changing the angle of tool slide 18.

Thereafter, cylindrical surface 34 is turned by cutting insert 22. Then curved surface 35, concave away from the axis of workpiece 15, is profiled. Again, the left portion of curved surface 35 cannot be cut with the tool slide at the angle shown. Accordingly, the cut is made conically along dotted line 36, and the left portion of curved surface 35 and cylindrical surface 37 are later formed by changing the angular set of tool slide 18. Curved surface 38 is then profiled convex toward the axis of workpiece 15. Conical surface 39 is thereafter profiled toward the end of workpiece 15.

It will be recognized by those skilled in the art that most of the surfaces of workpiece 15 can be cut with tool slide 18 at one angular setting, and thereafter the angle is changed to finish surfaces 32, 36 and 37. Further, the profile may be cut from right to left with the same or a different angular setting of the tool slide; or profiled in both directions, for example, by making a rough cut in one direction and a finish cut in the opposite direction.

Referring to FIGS. 4 through 7, the details of three cutting inserts 22, 22' and 22" are shown embodying the present invention. Each insert is of hard wear resistant material, typically tungsten carbide. In certain applications high carbon steel or powdered metalceramic may be suitable materials for the cutting insert.

Figure 5:
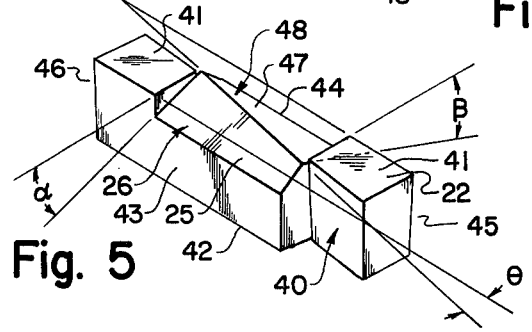
FIG. 5 is an enlarged perspective view of a cutting insert embodying the present invention as utilized in FIGS. 1 through 4.

Referring specifically to FIG. 5, cutting insert 22 is shown that is suitable for shallow grooving. The insert comprises body 40 having first and second opposed major surfaces 41 and 42, preferably both of substantially planar configuration. Body 40 also has indexing surfaces 43 and 44 preferably substantially parallel to each other and substantially perpendicular to major surfaces 41 and 42, and preferably both of substantially planar configuration. Indexing surfaces 43 and 44 are capable of precision indexing of insert 22 in cut-out 21 of tool holder 22 in either direction for cutting of metal from workpiece 15. Body 40 also has two cutting edges 45 and 46 at opposite end portions of body 40 for cutting metal.

In addition, body 40 has two notches 26 and 48 in first major surface 41. Notches 26 and 27 have engaging surfaces 25 and 47, respectively, forming compound angles with first major surface 41. Engaging surfaces 25 and 47 are defined by angles $\theta$ and $\phi$, respectively, of greater than about 10° and less than about 30° to indexing surfaces 43 and 44, respectively; and angles $\alpha$ and $\beta$, respectively, of greater than about 3° and preferably less than about 30° to a plane defined by first major surface 41. The $\theta$ and $\phi$ angles are selected greater than about 10° and less than about 30° to provide rigid clamping and holding of the insert in cut-out 21 of tool holder 20 with bridge clamp 23, whether the insert is fed to the workpiece in either the forward or reverse direction. For the later reason, angles $\theta$ and $\phi$ are preferably less than 20° and most desirably about 15°. The $\alpha$ and $\beta$ angles are also selected greater than about 3° to provide rigid clamping and holding of the insert in cut-out 21 of tool holder 20 with bridge clamp 23, whether the insert is fed to the workpiece in either the forward or reverse direction. All angles are also preferably selected less than about 30° to facilitate press-out of the insert during the molding operation in making the insert.

The length of surfaces 25 and 47 are sufficiently long to provide sufficient contact to hold the insert with the bridge clamp and are typically greater than ¼ inch in length.

Notches 26 and 48 are also complementary to each other. In this way, the cutting insert is adapted to be reversibly held in cut-out 21 of tool holder 20. The insert is indexed by either indexing surface 43 or 44 for cutting by either cutting edge 45 or 45 at opposite end portions of body 40. Cutting insert 22 is in turn capable of a prolonged life simply by rotation of the insert to a new cutting edge.

Figure 7:
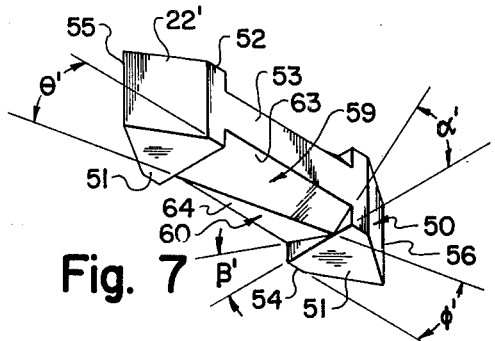
FIG. 7 is a second perspective view of the second cutting insert shown in FIG. 6.
Figure 6:
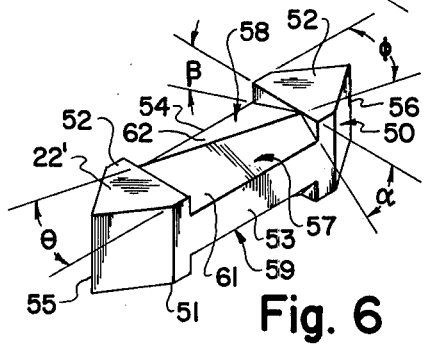
FIG. 6 is a perspective view of a second cutting insert embodying the present invention.

Referring specifically to FIGS. 6 and 7, cutting insert 22' is shown that is suitable for threading operations. The insert comprises body 50 having first and second opposed major surfaces 51 and 52, preferably both of substantially planar configuration. Body 50 also has indexing surfaces 53 and 54 preferably substantially parallel to each other and substantially perpendicular to major surfaces 51 and 52, and preferably both of substantially planar configuration. Indexing surfaces 53 and 54 are capable of precision indexing of insert 22' in cut-out 21 of tool holder 20 in either direction for cutting of metal from workpiece 15. Body 50 also has two cutting edges 55 and 56 at opposite end portions of body 50 for cutting metal.

Body 50 additionally has two notches 57 and 58 complementary to each other in first major surface 51 and two notches 59 and 60 complementary to each other in second major surface 52. Notches 57 and 58 have engaging surfaces 61 and 62, respectively, forming compound angles with first major surface 51; and notches 59 and 60 have engaging surfaces 63 and 64, repectively, forming compound angles with second major surface 52. Engaging surfaces 61 and 62 are defined by angles $\theta$ and $\phi$, respectively, of greater than about 10° and less than about 30° (preferably less than about 10° and most desirably about 15° ) to indexing surfaces 53 and 54, respectively, and angles $\alpha$ and $\beta$, respectively, of greater than about 3° and preferably less than about 30° to a plane defined by first major surface 51. Similarly, surfaces 63 and 64 are defined by angles $\theta'$ and $\phi'$, respectively, of greater than about 15° and less than about 30° (preferably less than about 20° and most desirably about 15°) to indexing surfaces 53 and 54, respectively, and angles $\alpha'$ and $\beta'$, respectively, of greater than about 3° and preferably less than about 30° to a plane defined by second major surface 52. Again, the angles $\theta$, $\theta'$, $\phi$ and $\phi'$ are each selected greater than 10° and less than 30°, and preferably less than 20° and most desirably at about 15°, to provide rigid clamping and holding of the insert in cut-out 21 of tool holder 20 with bridge clamp 23, whether the insert is fed to the workpiece in either the forward or reverse directions. The angles $\alpha$, $\alpha'$, $\beta$ and $\beta'$ are selected greater about 3°, respectively, to provide rigid clamping and holding of the insert in cut-out 21 of the tool holder 20 with bridge clamp 23, whether the insert is fed to the workpiece in either the forward or reverse direction. And again the angles $\alpha$, $\alpha'$, $\beta$ and $\beta'$ are each preferably selected less than 30° to facilitate press-out of the insert during mold operation in making the insert.

By this arrangement, maximum life can be given to the cutting insert 22'. The cutting insert is adapted to be reversibly held in cut-out 21 of tool holder 20 for use of both cutting edges 55 and 56. The insert can be indexed by either indexing surface 53 or 54 for cutting by either cutting edge 55 or 56 at opposite end portions of body 50. Cutting insert 22' is in turn capable of a prolonged life by flipping as well as rotation of the insert to a new cutting edge. It will be recognized by those skilled in the art that this insert 22 cannot be utilized where positive rake is desired as explained more fully hereinafter.

Figure 8:
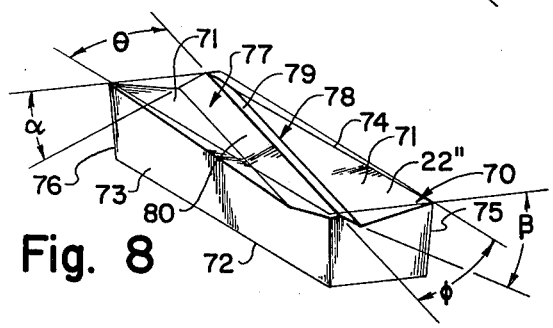
FIG. 8 is a perspective view of a third cutting insert embodying the present invention.

Referring specifically to FIG. 8, cutting insert 22" is shown that is capable of profiling operations. The cutting insert comprises body 70 having first and second opposed major surfaces 71 and 72 preferably of substantially planar configurations. Body 70 also has indexing surfaces 73 and 74 preferably substantially parallel to each other and preferably substantially perpendicular to major surfaces 71 and 72, and preferably both of substantially planar configuration. Indexing surfaces 73 and 74 are capable of precision indexing of insert 22" in cut-out 21 of tool holder 20 in either direction for cutting of metal from workpiece 15. Body 70 also has two cutting edges 75 and 76 at opposite end portions of body 70 for cutting metal.

In addition, body 70 has two notches 77 and 78 in first major surface 71 which are complementary to each other. Notches 77 and 78 have engaging surfaces 79 and 80, respectively, forming compound angles with first major surface 71. Engaging surfaces 79 and 80 are defined by angles $\theta$ and $\phi$, respectively, of greater than about 10° and less than about 30° (preferably less than about 20° and most desirably about 15°) to indexing surfaces 73 and 74, respectively, and angles $\alpha$ and $\beta$, respectively, of greater than about 3° and preferably less than about 30° to a plane defined by first major surface 71 for the reasons previously stated.

By this arrangement, maximum life can again be given to cutting insert 22". The cutting insert is adapted to be reversibly held in cut-out 21 of tool holder 20 for use of either cutting edges 75 or 76. The insert can be indexed by either indexing surface 73 or 74 for cutting by the cutting edges at both end portions of the insert. It will be recognized that this insert having positive rake cannot be adapted to flip to a new cutting edge as is provided with the insert shown in FIGS. 6 and 7.

Cutting inserts are generally made with a neutral rake so that they can be made economically by molding and the cutting insert can be utilized with either portions of the cutting edge upward or downward. The insert with a neutral rake is pitched in the cut-out of the tool holder to provide a negative rake. In a negative rake, the tool is presented to the workpiece titled upwardly to provide clearance between the workpiece and lower portion of the cutting edge facing the workpiece. The angle between the upper major surface of the insert over which the chips flow and a vertical plane tangent to the workpiece will be an angle of less than 90°.

Negative rake machining conditions are not always desired because of the nature of the workpiece material, the finish desired on the workpiece, and the limited amount of power which may be available to turn the workpiece against the tool. Under these conditions, an insert having positive rake is desired. The positive rake insert involves more of a shearing action in cutting so that more difficult and clearer cuts can be made often with reduced power requirements. A positive rake insert is one made and used with the included angle between the surfaces forming the cutting edge less than 90°. The angle between the upper surface of the insert over which the chip flows and a vertical plane tangent to the workpiece is in turn greater than 90°.

Figure 4:
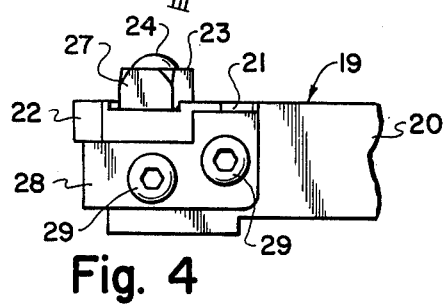
FIG. 4 is a partial elevational view of the tool holder assembly shown in FIG. 2.

The important aspect is that the present invention can be utilized with inserts of either negative or positive rake type. Specifically, FIGS. 4 and 7 show inserts with positive rake, and FIGS. 5 and 6 show an insert with neutral rake which is utilized in negative rake operation.

While the presently preferred embodiments have been shown and described with particularlity, it is distinctly understood that the invention may be otherwise variously embodied and performed within the scope of the following claims.

What is claimed is:

1. A cutting insert comprising:
   A. a body of hard wear resistant material having first and second opposed major surfaces, at least one indexing surface capable of precision indexing of the body in a tool holder and at least one cutting edge at an end portion for cutting metal;
   B. at least one notch in said first major surface adapted to rigidly hold the body in a tool holder with the indexing surface and a bridge clamp, said notch having an engaging surface forming a compound angle with said first major surface defined by an angle of greater than about 10° and less than about 30° to the indexing surface and an angle of greater than about 3° to a plane defined by the first major surface.

2. A cutting insert as set forth in claim 1 wherein: the engaging surface of said notch forms a compound angle defined by an angle of less than about 20° to said indexing surface.

3. A cutting insert as set forth in claim 1 wherein:
   i. said body has two substantially parallel indexing surfaces; and
   ii. two said notches are in the first major surface complementary to each other and adapted to reversibly hold the body in the tool holder with an indexing surface and a bridge clamp to provide for cutting with cutting edges at opposite end portions of the body.

4. A cutting insert as set forth in claim 3 wherein: the engaging surface of each said notch forms a compound angle defined by an angle of less than about 20° to an indexing surface.

5. A cutting insert as set forth in claim 1 comprising in addition:
   C. at least one notch in said second major surface adapted to rigidly hold the body in the tool holder with the indexing surface and a bridge clamp, said notch having an engaging surface forming a compound angle with said second major surface defined by an angle greater than about 10° and less than about 30° to an indexing surface and an angle of greater than about 3° to a plane defined by the second major surface.

6. A cutting insert as set forth in claim 5 wherein: the engaging surface of each said notch forms a compound angle defined by an angle of less than about 20° to an indexing surface.

7. A cutting insert as set forth in claim 5 wherein:
   i. said body has two substantially parallel surfaces; and
   ii. two said notches are in the first and second major surfaces complementary to each other and adapted to reversibly hold the body in the tool holder with an indexing surface and a bridge clamp to provide for cutting with cutting edges at opposite end portions of the body.

8. A cutting insert as set forth in claim 7 wherein: the engaging surface of each said notch forms a compound angle defined by an angle of less than about 20° to an indexing surface.

9. A tool holder assembly comprising:
   A. a tool holder having a cut-out therein for precision indexing of a cutting insert for the cutting of metal;
   B. a bridge clamp for holding a cutting insert in said cut-out of the tool holder, said bridge clamp being removably fastened to said tool holder;
   C. a cutting insert of hard wear resistant material having first and second opposed major surfaces, at least one indexing surface capable of precision indexing of the insert in the cut-out of the tool holder and at least one cutting edge at an end portion for cutting material; and
   D. at least one notch in said first major surface adapted to rigidly hold the cutting insert in the cut-out of the tool holder with the indexing surface and the bridge clamp, said notch having an engaging surface forming a compound angle with said first major surface defined by an angle greater than about 10° and less than about 30° to the indexing surface and an angle greater than about 3° to a plane defined by the first major surface.

10. A tool holder as set forth in claim 9 wherein: the engaging surface of said notch forms a compound angle defined by an angle of less than about 20° to said indexing surface.

11. A tool holder assembly as set forth in claim 9 wherein:
    i. said cutting insert has two substantially parallel indexing surfaces; and
    ii. two said notches are in the first major surface complementary to each other and adapted to reversibly hold the insert in the tool holder with an indexing surface and the bridge clamp to provide for cutting with cutting edges at opposite end portions of the insert.

12. A tool holder as set forth in claim 11 wherein: the engaging surface of each said notch forms a compound angle defined by an angle of less than about 20° to an indexing surface.

13. A tool holder assembly as set forth in claim 9 comprising in addition:
    C. at least one notch in said second major surface adapted to rigidly hold the cutting insert in the tool holder with the indexing surface and the bridge clamp, said notch having an engaging surface forming a compound angle with said second major surface defined by an angle greater than about 10° and less than about 30° to an indexing surface and an angle greater than about 3° to a plane defined by the second major surface.

14. A tool holder as set forth in claim 13 wherein: the engaging surface of each said notch forms a compound angle defined by an angle of less than about 20° to an indexing surface.

15. A tool holder assembly as set forth in claim 13 wherein:
    i. said cutting insert has two substantially parallel surfaces; and
    ii. two said notches are in the first and second major surfaces complementary to each other and adapted to reversibly hold the insert in the tool holder with an indexing surface and the bridge clamp to provide for cutting with cutting edges at opposite end portions of the insert.

16. A tool holder as set forth in claim 15 wherein: the engaging surface of each said notch forms a compound angle defined by an angle of less than about 20° to an indexing surface.

* * * * *